(12) United States Patent
Minke

(10) Patent No.: US 7,857,311 B2
(45) Date of Patent: Dec. 28, 2010

(54) STAND FOR A VIDEO GAME CONTROLLER

(75) Inventor: Ronald C. Minke, Leo-Cedarville, IN (US)

(73) Assignee: Aptimise Composites LLC, Fort Wayne, IN (US)

(*) Notice: Subject to any disclaimer, the term of this patent is extended or adjusted under 35 U.S.C. 154(b) by 509 days.

(21) Appl. No.: 11/880,329

(22) Filed: Jul. 20, 2007

(65) Prior Publication Data

US 2009/0020665 A1    Jan. 22, 2009

(51) Int. Cl.
*A63B 71/00* (2006.01)

(52) U.S. Cl. .................................................. 273/148 R

(58) Field of Classification Search ........................ None
See application file for complete search history.

(56) References Cited

U.S. PATENT DOCUMENTS

| | | | | |
|---|---|---|---|---|
| 3,601,443 A | * | 8/1971 | Jones | 297/188.21 |
| 3,712,669 A | * | 1/1973 | Cates | 297/188.21 |
| 4,427,382 A | * | 1/1984 | Hoffmeister et al. | 433/79 |
| 4,500,134 A | * | 2/1985 | Kaneko et al. | 297/170 |
| 4,630,817 A | * | 12/1986 | Buckley | 463/37 |
| 4,645,167 A | * | 2/1987 | Hardwick | 248/520 |
| 4,925,240 A | * | 5/1990 | Peters | 297/161 |
| 5,054,771 A | * | 10/1991 | Mansfield | 463/36 |
| 5,489,142 A | * | 2/1996 | Mathieu | 297/327 |
| 5,762,617 A | * | 6/1998 | Infanti | 601/49 |
| 5,765,911 A | * | 6/1998 | Sorenson | 297/173 |
| 5,779,305 A | * | 7/1998 | Hocking | 297/217.4 |
| 6,102,476 A | * | 8/2000 | May et al. | 297/217.3 |
| 6,347,999 B1 | * | 2/2002 | Yuan | 463/46 |
| 6,530,842 B1 | * | 3/2003 | Wells et al. | 463/46 |
| D474,183 S | * | 5/2003 | Mesa | D14/413 |
| 6,663,058 B1 | * | 12/2003 | Peterson et al. | 248/125.9 |
| D510,306 S | | 10/2005 | Swan et al. | |
| 7,156,026 B2 | * | 1/2007 | McClellion | 108/43 |
| 7,297,060 B2 | * | 11/2007 | Brase et al. | 463/36 |
| 7,309,286 B2 | * | 12/2007 | Hedrick et al. | 463/37 |

* cited by examiner

*Primary Examiner*—Gene Kim
*Assistant Examiner*—Dolores Collins
(74) *Attorney, Agent, or Firm*—Brooks Kushman P.C.

(57) ABSTRACT

One aspect of the current invention is directed toward a stand for a video game controller. In one embodiment, a stand is disclosed which comprises a seating device, an anchor member operably connected to the seating device, an elongate upstanding member selectably connected to the seat with the anchor member being connected to the upstanding member, and a platform connected to the upstanding member. In this embodiment, the anchor member permits rotation in a forward direction of the upstanding member and the platform.

18 Claims, 3 Drawing Sheets

STAND FOR A VIDEO GAME CONTROLLER

BACKGROUND OF THE INVENTION

1. Field of the Invention

The present invention relates to a stand for a video game controller.

2. Background Art

Many people enjoy playing video games for entertainment. Some of the video games include driving or flying simulations. To increase realism in these games, the control of the simulations is accomplished by a video game controller, that may include such components as a pad, a joy stick, a yoke, a video screen and/or a steering wheel. In addition, there may be foot-operated controls used in conjunction with the controller.

A recent addition to increase the realism of the simulation is force feedback. Force feedback includes a motor in the controller that provides simulated feedback to a user. Improved realism may be achieved by maintaining the controller at a fixed position in space. In the absence of a fixed position for the controller, many users witness the controller and the user migrating to dispositions rendering the controller effectively inoperable. Related art may be categorized as stabilizing devices that attach to the user's body, that are placed in front of the user and rely on shape factor for stability, and that at least partially encapsulate the user, such as a cockpit.

As an example of the stabilizing device that attaches to the user's body, in U.S. Design Pat. D 510,306, a lap attachment is a relatively cost effective solution to constraining the controller in a fixed position. Using the lap attachment, a user attempts to rigidly position the controller between the user's thighs and the chair. Since the user is often coordinating hand and foot motions, frequently the mass and/or friction applied to the lap attachment becomes insufficient to restrain the controller in a fixed position. Even when the mass is properly applied, the thighs are slightly compressible. In effect, the thighs, and possibly a cushioned chair, typically act as moderate force springs. The controller, as a consequence, does not readily remain in a fixed position.

As an example of the stabilizing device that is placed in front of the user and relies on shape factor for stability, some video controller stands incorporate stabilizing bases that are broader than the chair width. If the stabilizing base is too narrow, the typical user overcomes the stabilizing force. As a consequence, the controller does not remain in a fixed position. If a relatively wide base is used, the user may have difficulties with storing the seat and is limited in the number of spaces where the controller can be used because of the space requirements.

In an inexpensive example of the shape factor, in U.S. Pat. No. 7,156,026, the video controller stand may be placed in front of the chair. If the stand is not attached to the chair, the stand moves readily and becomes effectively inoperable, particularly when force feedback is present. If the stand is attached to the chair, structure is again used for stability. The stabilizing base is too narrow and many times the typical user overcomes the stabilizing force. In addition, the user must push the stand and controller away to exit the seat.

In another inexpensive example, U.S. Pat. No. 6,663,058, in some video game controller stands the frame rests on the ground. The stand relies on the structure of the base to provide stability through its width. The stabilizing base is too narrow and many times the typical user overcomes the stabilizing force. In addition, the user must push the stand and controller away to exit the seat.

Another example of a stabilizing device is the cockpit-like stand that at least partially encapsulates the user. The cockpit-like stands are large relatively expensive structures that rely on shape factor and weight for stability. The stands occupy a substantial amount of floor space because they closely approach the size of a real race car or flight cockpit.

What is needed is a relatively inexpensive video controller stand that is compact and provides a highly stable mounting platform for the controller even when the force feedback feature is present.

BRIEF SUMMARY OF THE INVENTION

An aspect of the present invention discloses a stand for a video game controller.

In certain embodiments of the present invention, a stand for a video game controller that is positionable on a floor is disclosed. In certain embodiments, the stand comprises a seating device and an anchor member selectably, operably connected to the seating device. Selectably connected to the seat is an elongate upstanding member with the anchor member being connected to the upstanding member. A platform is connected to the upstanding member. The anchor member permits rotation in a forward direction of the upstanding member and the platform.

In certain embodiments, the stand comprises a seating device having a seat having a front end and a rear end, at least two legs, and a securing device adjacent to the front end of the seat. An upstanding member operably connects to the seating device at an elevation below the seat. The upstanding member is disposed at a position intermediate between the two legs when the upstanding member is in a playing position. The upstanding member is rotatable from an exiting position to the playing position. In the playing position, the upstanding member is selectably securable to the securing device. A platform is connected to the upstanding member and adapted for attaching a video game screen and a steering device.

In certain embodiments, the stand comprises an upstanding member having at least one vertical member having a first top end and a first bottom end and a securing point intermediate between the first ends. At least one angled member has a second top end and a second bottom end. The second top end is connected to the first bottom end. The second bottom end is adapted to move about a first fixture sufficiently that the securing point cooperates with a second fixture when the upstanding member is moved from an exiting position to a playing position. The first fixture is operably connected to the floor. The second fixture is elevated above the first fixture. A platform is connected to the first top of the upstanding member and is adapted for operably connecting with a steering device of a video game controller.

DETAILED DESCRIPTION OF THE INVENTION

Reference will now be made in detail to compositions, embodiments and methods of the present invention known to the inventors; however, it should be understood that the disclosed embodiments are merely exemplary of the present invention, which may be embodied in various alternative forms. Therefore, specific details disclosed herein are not to be interpreted as limiting, but merely as a representative basis for teaching one skilled in the art to variously employ the present invention.

Except where expressly indicated, all numerical quantities in this description indicating the amounts of material or conditions are understood as modified by the word "about" in describing the broadest scope of the present invention. Practice within the numerical limits is generally preferred.

Figure 1:
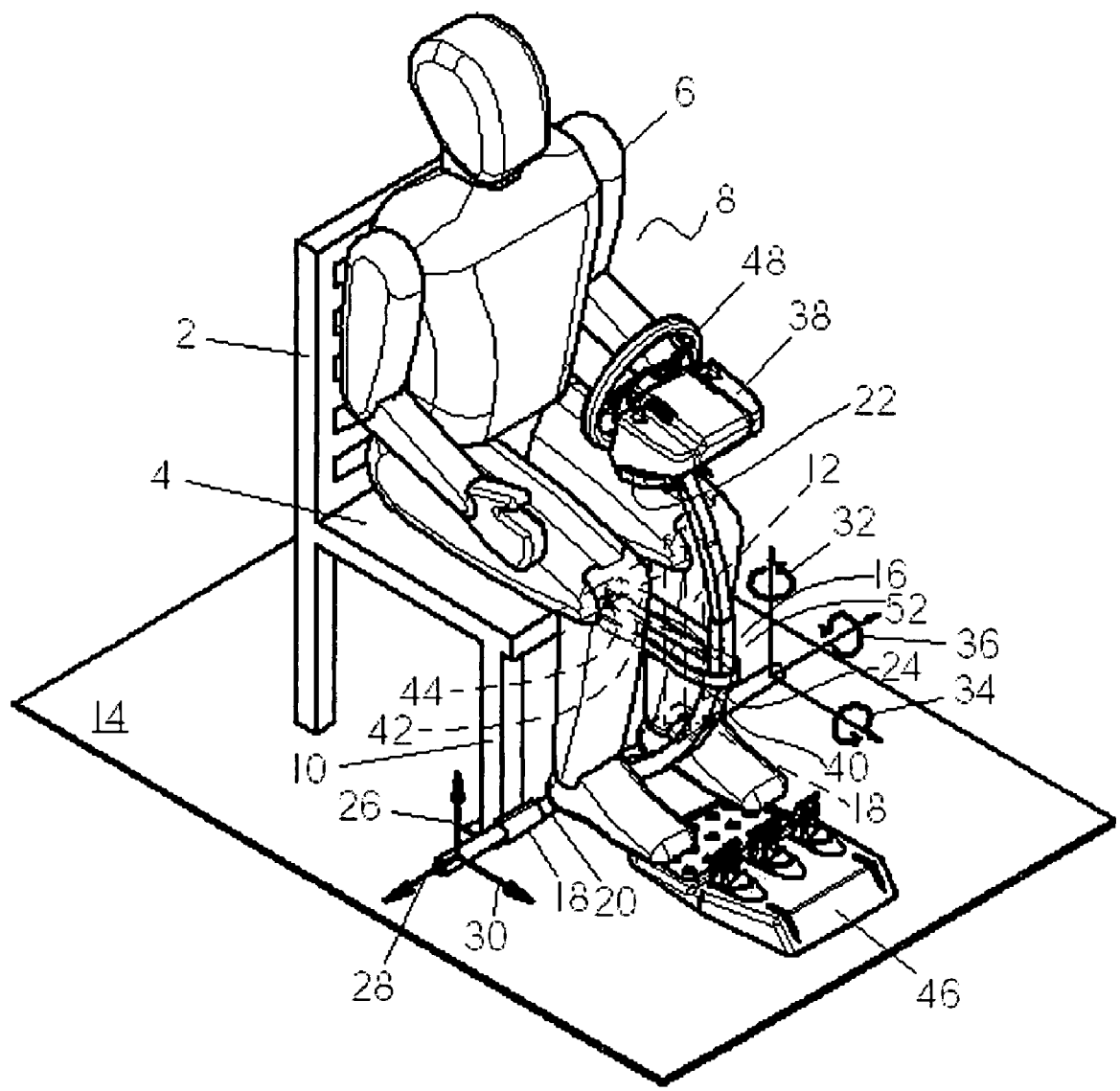
FIG. 1 illustrates a perspective view of a video controller stand according to an embodiment of the present invention.

Referring to FIG. 1 illustrating a portion of a video game user's play space, the present invention includes a chair 2 having a seat 4 for a user 6 and at least two legs 10 and 12 positioned on a floor 14. The video controller stand 16 is secured to the chair 2 with a bracket 18 through which a rod 20 passes. The stand 16 is positioned in the playing position 8. A controller mounting pad 22 is connected to the rod 20 with an upright 24 therebetween. For the combined rod 20 and upright 24 there are three axes of translation 26, 28, and 30 and three axes of rotation 32, 34, and 36. A video game controller 38 may be mounted on the mounting pad 22. In certain embodiments, a selectively securable band 40, such as a hook and loop strap with a spacer block 42 is connected to the chair 2 at about seat height using a screw 44 attached to the seat 4. The band 40 wraps around the upright 24 at a securing point intermediate between the ends of the upright 24 and fastens to itself. The spacer block 42 may limit the range of rotation in the backward direction towards the chair 2. It is understood that other means for limiting the range of rotation such as contacting the seat 4 of the chair 2 or snapping into a C-section (not shown) may be used without violating the spirit of the present invention. An optional foot pedal controller 46 may be present for additional controls for the video game. In the presence of the foot pedal controller 46, the user may remove his or her feet from the floor without impacting the stability of the video game controller stand 16.

It should be further understood that the bracket 18 may be located on other parts of the chair 2. Non-limiting examples of the bracket 18 may include using fasteners to connect the rod 20 directly to the chair 2, incorporating a C-section to receive the rod 20 into a blow-molded chair base, or making a hole through the chair legs. In addition, the bracket may comprise one or more units, possibly connected to one another.

Further, the combination of the bracket 18, rod 20, and upright 24 may be made as a single unit or multiple articles. Examples are illustrated below.

Positioning the user 6 on the seat 4 puts the user's 6 weight on the chair legs 10 and 12 securing the bracket 18 and rod 20 in all three of the axes of motion 26, 28, and 30, and two of three axes of rotation 32 and 34 allowing the user 6 to keep the video game controller steering wheel 48 in a relatively fixed position. With the band 40 attached, the third axis of rotation 36 becomes constrained and relatively fixes the video game controller stand 16 in space.

The present invention may fix the controller within a range of rotation and/or translation of five axes. The ranges may be independently selected from 2, 5, 8, or 10 to 12, 15, or 20 degrees of rotation of axes 32 and 34; and ⅛, ¼, or ½ to 1, 2, or 4 inches of translation in the three axes 26, 28, and 30. Further, rotation about the sixth axis 36 may be independently selected from 5, 10, 15, or 20 degrees to 25 or 30 degrees of rotation when in the playing position 8. When the game is completed, the upright 24 may be rotated 30, 45, 60, or up to 90 degrees away from the user 6 to an inactive position (not shown) allowing the user 6 to easily exit the seat 2.

While FIG. 1 illustrates the upright 24 with an outwardly curved bow 52, it should be understood that the upright may include a three-bar or four-bar linkage and/or be straight, angled, hinged, recurved, S-curved, articulated, compound curved, or inwardly curved without violating the intent of the invention. Further, it should be understood that the upright 24 may be a single upright, a U-shaped upright and/or channel, or have a plurality of uprights without violating the spirit of the invention. Further, an end of the upright 24 may include at least one angled support (not shown). This support may be, for a non-limiting example, a radiused continuation of the upright 24 that extends approximately perpendicular to the upright 24 or may form obtuse angles relative to a vertically oriented axis of the upright body 24. If an embodiment includes two angled supports, it may appear almost like a triangle when coupled with an anchor member such as the rod 20 when the rod 20 connects to lower ends of two opposed angled supports.

The controller mounting pad 22 may be fixed, rotate and/or translate relative to the upright 24. The video game controller 38 may be secured to the controller mounting pad 22 by attachment means known in the industry. The mounting pad 22, in certain embodiments, may be incorporated into the video game controller 38.

The floor 14 may be comprised of a traditional house surface or other floor surfaces known in the art. It should be understood that the floor 14 may be covered with other surfaces such as carpet or linoleum without departing from the spirit of the invention. Further, the chair 2 may be connected to a separate base (not shown) which may be positioned on the floor 14 without departing from the spirit of the invention.

Figure 2:
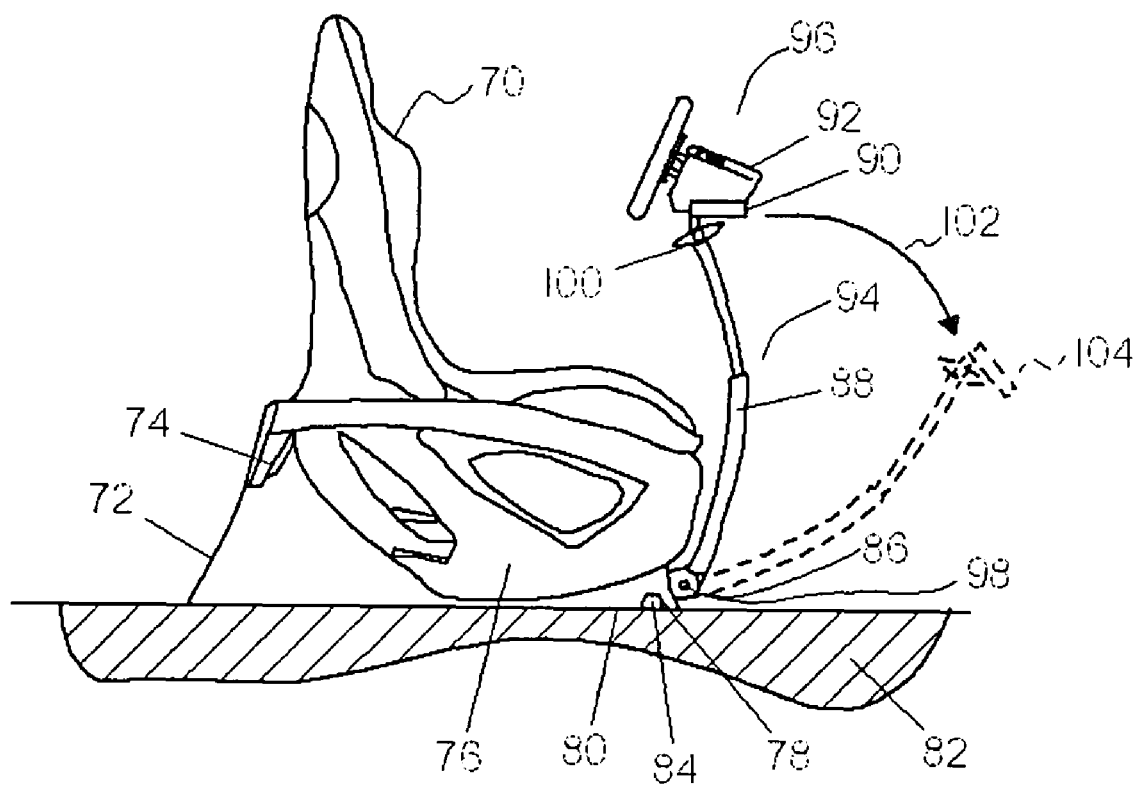
FIG. 2 illustrates a perspective view of a video controller stand including a gaming seat according to an embodiment of the present invention.

Referring now to FIG. 2, a gaming chair 70, a non-limiting example of which is an AK ROCKER Model 200 by AK Designs (Bluffdale, Utah), may be fitted into a gaming chair base 72. The base 72 supports the downstanding columns 74 and the rocker 76 of the gaming chair 70. The base 72 has a receiving cavity 78 incorporated into the bottom side 80 of the base 72, which is adjacent to the floor 82. Pivotably connected into the receiving cavity 78 is a connector 84, such as a rod or a curved bar, which connects to a pin hitch 86 approximately at the midpoint of the connector. The pin hitch 86 pivotably connects to an extensible post 88 which connects the connector 84 with the controller mounting pad 90 which supports the video game controller 92. The extensible post 88 may allow for the controller 92 to be positioned to the user's height for good ergonomic comfort. Further, the extensible post 88 may be curved outwardly 94 to allow the game controller to be positioned more closely to a player in the game playing position 96. The extensible post 88 may be secured in the game playing position 96 using a catch 98 built into the pin hitch 86. The catch 98 may be released by turning the handle 100 to activate a cable (not shown) or similar device connecting the handle 100 and the catch 98. When released, the extensible post 88 may pivot in the forward direction 102 to a non-playing position 104 so that the user may exit the gaming chair 70 with relative ease.

The extensible post may be made compact for storage by shortening the post. Examples of the shortening or extending mechanism are well known in the art and may include, in a non-limiting sense, snap fits, spring loaded ball and socket combinations, or telescoping mechanisms.

The extensible post 88 may be comprised of relatively rigid materials and forms. Examples of forms may include a solid beam, an articulated arm, or a hollow tube. Typical materials may include thermoplastic plastic, thermoset plastic, or metal such as aluminum, white metal, or alloys including aluminum, copper, or zinc. In addition, the extensible post may be formed in multiple sections, a single homogeneous section or a single composite section. It should be understood that the various components of the extensible post, if any, may be comprised of one or more materials, including some relatively soft materials coated over a rigid section. It may be advantageous to have such overcoating of soft materials such as thermoplastic polyurethane to protect the user and to provide a comfortable touch and feel to the post 88.

The base 72 may be designed to allow room for comfort if the user's feet are tucked under the gaming chair slightly. This is facilitated by placing the connector 84 further under the base 72 and extending only the pin hitch 86.

It should be understood that the extensible post 88 may be connected directly to the connector 84 without violating the spirit of the present invention.

The base 72 may be relatively light in weight to facilitate movement for storage. Examples of such light construction may be accomplished by forming an essentially hollow base. Examples of non-limiting methods for forming these essentially hollow bases may include blow-molding, preparing hand layup composites, twin-sheet thermoforming or roto-molding such bases. It should be understood that the base may be fabricated in one or more sections. If more than one section is used, the base may be assembled. The sections may use one or more materials.

Typical materials for such processes may include thermoplastics, including polyolefin, polyvinyl chloride, long fiber thermoplastic, and polyalkylene terephthalate; or thermosets, including polyester, fiberglass reinforced polyester, or polyurethane.

Figure 3:
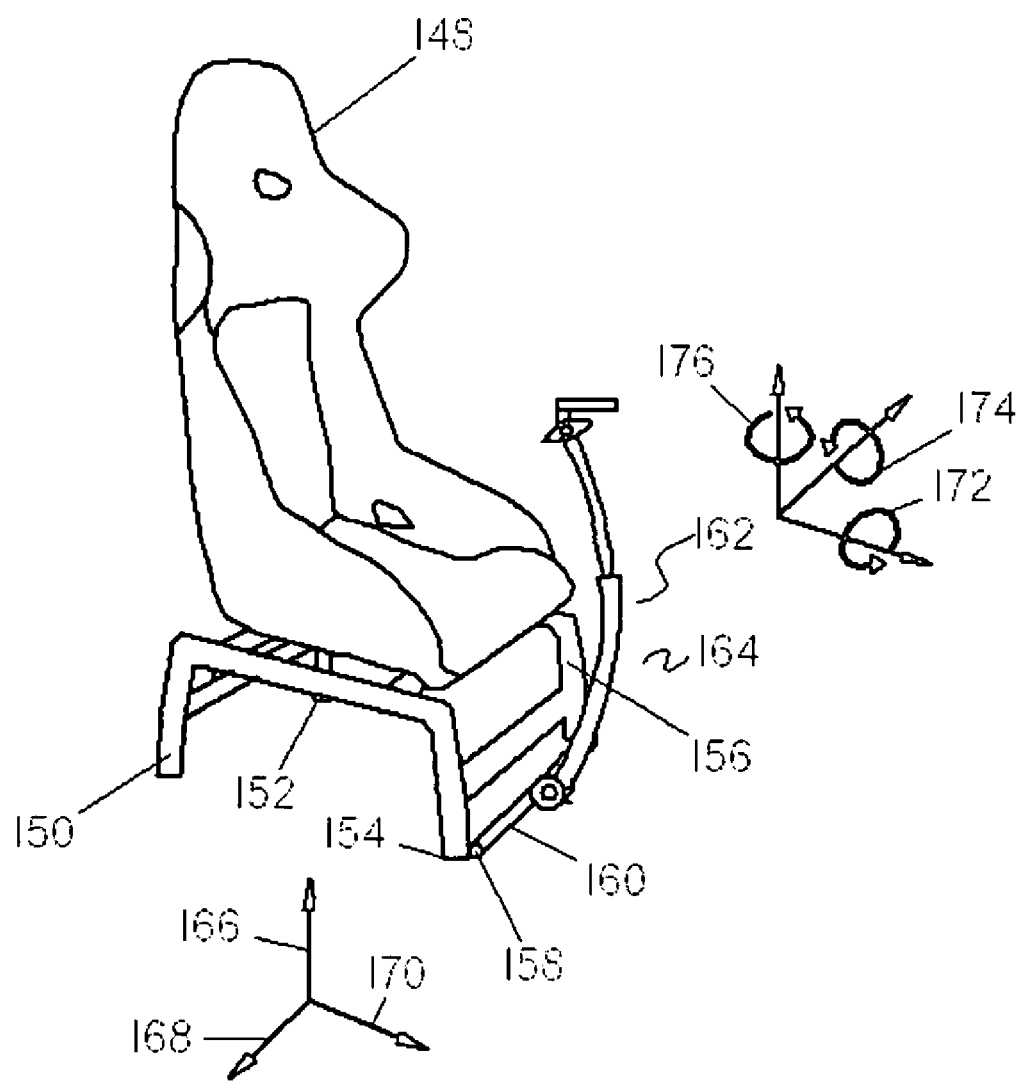
FIG. 3 illustrates a perspective view of a video controller stand including a gaming seat according to an embodiment of the present invention.

Referring to FIG. 3, a gaming chair 148 such as an Ultimate Gaming Chair (Antioch, Calif.) or the Gaming Base (Corbeau LLC, Bluffdale, Utah) having four legs 150, 152, 154, and 156 comprised of a ferrous material, connects magnetically to a rotatable ball-and-socket joint 158 disposed on at least one of front leg 154, and optionally, a second front leg 156. The joint 158 connects to a tube 160 and is secured to the leg 154 as well as selectably connects to the leg 156, when in the playing position 162. The tube 160 may be disconnected from leg 156 and swung aside on the ball-and-socket joint 158 when the player exits the gaming chair 148 and the video controller stand 164 is placed in the exiting/entry position (not shown).

It should be understood that the tube 160 and connection to the ball-and-socket joint 158 may be sufficiently rigid in the translational and rotational directions, 166, 168, 170 and 172, 174, 176, respectively, that securing the tube 160 to another leg 156 of the gaming chair 148, may not be needed to relatively fix the video game controller in space.

In using the video game controller stand, the user will connect the stand to the fixture to hold the stand adjacent to the chair. This fixture may include, but is not limited to, the bracket, the C-channel in the gaming chair base, or holes in the legs of the chair. Depending upon the fixture used, the video game controller stand may be slid into place, connected by an interference fit, mechanically secured, or other attachment means known in the art. In the exit position, the video game controller stand is typically in contact with the floor or an optional stand in contact with the floor. The user takes the position in the seat and draws the video game controller stand off of the floor and towards the seat. As an option, the user connects the video game controller stand to the seat either in a rigid or a flexible manner. The video game controller stand including the steering device for the video game and an optional video game screen are now relatively fixed in space.

The user may then play the game and have good control of the positioning of the steering device in space. After completing the game, the user may optionally detach the video game controller stand from the seat and lower the stand towards the floor. Once the video game controller stand is in the exit position, the user may get up from the chair and leave the area.

Example 1

In this example, the video game controller stand is fabricated using ½" diameter steel pipe that has a tensile strength in excess of 55,000 psi when tested according to ASTM D638 at 73° F. When the video game controller stand is connected to the AK ROCKER Model 100 seat using small blocks with brackets under the front ends of the rocker, and is secured to the seat using VELCRO hook-and-loop connectors fastened to the seat, the motion of the steering wheel is limited to about 10° of rotation or 2 inches of translation from the center position. A test user indicates that this amount of constraint allows adequate control of the steering device for the game.

Counter Example 1

In this example, the video game controller stand is fabricated using 2" diameter Schedule 40 PVC pipe that has a tensile strength of 5300-8050 psi when tested according to ASTM D638 at 73° F. When the video game controller stand is connected to the AK ROCKER Model 100 seat using small blocks with brackets under the front ends of the rocker, and is secured to the seat using VELCRO hook-and-loop connectors fastened to the seat, the motion of the steering wheel moves at least about 20° of rotation or 5 inches of translation from the center position. In this condition, the game becomes uncontrollable in the opinion of the test user.

While the best mode for carrying out the invention has been described in detail, those familiar with the art to which this invention relates will recognize various alternative designs and embodiments for practicing the invention as defined by the following claims.

I claim:

1. A stand for a video game controller positionable on a floor, the stand comprising:
    a seating device having a seat;
    an anchor member selectably, operably connected to the seating device and spaced apart from the seat;
    an elongate upright member selectably connected to the seating device, the anchor member being connected to the upright member, the elongate upright member having a first end adjacent to the seating device, a second end opposed to the first end, and an attachment position therebetween, the first end being adjacent to the anchor member and the seat being connected to the upright member at the attachment position; and
    a platform connected to the upright member adjacent to the second end of the elongate upright member;
    wherein the anchor member permits rotation in a forward direction of the upright member and the platform.

2. The stand of claim 1, wherein the anchor member includes a base cooperable with the seating device.

3. The stand of claim 2, wherein the base defines a cavity adapted to receive a rod connected to the elongate upright member.

4. The stand of claim 1, wherein the elongate upright member is slidingly extensible.

5. The stand of claim 1 with a video game controller, wherein the controller includes a motor providing force feedback to a steering device, the steering device being operatively connected to the platform.

6. The stand of claim 1, wherein the seating device includes a front edge having a channel open to the front edge, the channel adapted to receive the elongate upright member and limit the rotation of the upright member in the direction toward the seat.

7. The stand of claim 1, wherein the anchor member includes a bracket.

8. The stand of claim 7, wherein the bracket is adapted to receive a rod connected to the elongate upright member.

9. The stand of claim 8, wherein the seating device is a chair having at least two legs, the bracket being secured to at least one leg.

10. The stand of claim 1, wherein the elongate upright member includes a lower end having a first angled support and a second angled support, the angled supports being opposed and disposed at obtuse angles relative to the elongate upright member and securing the upright member to the anchor member.

11. A stand for a video game controller positionable on a floor, the stand comprising:
- a seating device having a seat having a front end and a rear end, at least two legs, and a securing device adjacent to the front end of the seat;
- an upright member operably connected to the seating device at an elevation below the seat, the upright member being disposed at a position intermediate between the two legs when the upright member is in a playing position, the upright member being rotatable from an exiting position to the playing position, wherein the upright member is selectably securable to the securing device in the playing position; and
- a platform connected to the upright member and adapted for attaching a video game screen and a steering device of a video game controller.

12. The stand of claim 11, wherein the upright member has at least one angled section directed toward at least one leg of the seating device.

13. The stand of claim 12, wherein the leg of the seating device has an aperture and is adapted to be operatively connected to the angled section.

14. The stand of claim 11, wherein the upright member comprises a material having a tensile strength exceeding 8050 psi when tested according to ASTM D638 at 73° F.

15. A stand for a video game controller positionable on a floor, the stand comprising:
- an upright member having at least one vertical member having a first top end and a first bottom end and a securing point intermediate between the first ends;
- at least one angled member having a second top end and a second bottom end, the second top end connected to the first bottom end, the second bottom end adapted to move about a first fixture sufficiently that the securing point cooperates with a second fixture when the upright member is moved between an exiting and a playing position, the first fixture being operably connected to the floor, the second fixture being elevated above the first fixture; and
- a platform connected to the first top of the upright member and adapted for operably connecting with a steering device of a video game controller.

16. The stand of claim 15, wherein the first fixture comprises a gaming chair.

17. The stand of claim 15, wherein the angled member is disposed approximately perpendicular to the upright member.

18. The stand of claim 15, wherein the second fixture includes a hook-and-loop strap.

* * * * *